United States Patent
Grefsheim (10) Patent No.: US 9,874,366 B2
(45) Date of Patent: Jan. 23, 2018

(54) SYSTEM AND METHOD FOR ADJUSTING FRACTIONAL ON-TIME AND CYCLE TIME TO COMPENSATE FOR WEATHER EXTREMES AND MEET VENTILATION REQUIREMENTS

(71) Applicant: Research Products Corporation, Madison, WI (US)

(72) Inventor: Scott Grefsheim, Madison, WI (US)

(73) Assignee: Research Products Corporation, Madison, WI (US)

( * ) Notice: Subject to any disclaimer, the term of this patent is extended or adjusted under 35 U.S.C. 154(b) by 307 days.

(21) Appl. No.: 14/812,624

(22) Filed: Jul. 29, 2015

(65) Prior Publication Data
US 2016/0033155 A1   Feb. 4, 2016

Related U.S. Application Data

(60) Provisional application No. 62/030,953, filed on Jul. 30, 2014.

(51) Int. Cl.
*F24F 11/00* (2006.01)
*G05B 15/02* (2006.01)

(52) U.S. Cl.
CPC ........ *F24F 11/006* (2013.01); *F24F 11/0001* (2013.01); *F24F 11/0017* (2013.01); *G05B 15/02* (2013.01); *Y02B 30/78* (2013.01)

(58) Field of Classification Search
CPC .. F24F 11/006; F24F 11/0017; F24F 11/0001; G05B 15/02; Y02B 30/78
See application file for complete search history.

(56) References Cited

U.S. PATENT DOCUMENTS

| | | |
|---|---|---|
| 4,072,800 A | 2/1978 | Gammer |
| 4,191,917 A | 3/1980 | Brown et al. |
| 4,391,883 A | 7/1983 | Williamson et al. |
| 4,602,739 A | 7/1986 | Sutton et al. |
| 4,621,336 A | 11/1986 | Brown et al. |

(Continued)

FOREIGN PATENT DOCUMENTS

| | | |
|---|---|---|
| EP | 246443 A1 | 11/1987 |
| JP | 01270925 A | 10/1989 |

(Continued)

OTHER PUBLICATIONS

"Humidity Control Panel and Ventilation Timer Operation Instructions", (TS-233-1198), 2 pgs.

(Continued)

*Primary Examiner* — Robert Fennema
*Assistant Examiner* — Marzia T Monty
(74) *Attorney, Agent, or Firm* — Boardman & Clark LLP (57) ABSTRACT

A ventilation method and system is described for providing adequate ventilation to an indoor environment while avoiding certain periods of times where ventilation air conditions or other control variables tend to be less optimal or preferable for ventilation, but while still meeting established or future ventilation air standards. The described system and method utilize incremental target cycle times determined based on a regression analysis estimating expression of fractional on time as a function of effectiveness multiplied by fractional on time for a corresponding cycle periods.

14 Claims, 3 Drawing Sheets

(56) References Cited

U.S. PATENT DOCUMENTS

| | | |
|---|---|---|
| 4,838,482 A | 6/1989 | Vogelzang et al. |
| 4,898,086 A | 2/1990 | Norris et al. |
| 5,230,482 A | 7/1993 | Ratz et al. |
| 5,261,481 A | 11/1993 | Baldwin et al. |
| 5,319,942 A | 6/1994 | Paustian et al. |
| 5,323,961 A | 6/1994 | Hurmi |
| 5,329,991 A | 7/1994 | Mehta et al. |
| 5,547,017 A | 8/1996 | Rudd |
| 5,579,993 A | 12/1996 | Ahmed et al. |
| 5,590,831 A | 1/1997 | Manson et al. |
| 5,598,715 A | 2/1997 | Edmisten et al. |
| 5,722,887 A | 3/1998 | Wolfson et al. |
| 5,782,296 A | 7/1998 | Mehta et al. |
| 5,873,519 A | 2/1999 | Beilfuss et al. |
| 5,881,806 A | 3/1999 | Rudd |
| 5,971,067 A | 10/1999 | DeLuca et al. |
| 6,220,039 B1 | 4/2001 | Kensok et al. |
| 6,230,980 B1 | 5/2001 | Hudson et al. |
| 6,254,009 B1 | 7/2001 | Proffitt et al. |
| 6,318,639 B1 | 11/2001 | Toth et al. |
| 6,431,268 B1 | 8/2002 | Rudd et al. |
| 6,467,696 B2 | 10/2002 | Riley et al. |
| 6,502,758 B2 | 1/2003 | Cottrell et al. |
| 6,514,138 B2 | 2/2003 | Estepp et al. |
| 6,535,138 B1 | 3/2003 | Dolan et al. |
| 6,619,063 B1 | 9/2003 | Brumett |
| 6,988,671 B2 | 1/2006 | DeLuca et al. |
| 7,044,397 B2 | 5/2006 | Bartlett et al. |
| 7,222,494 B2 | 5/2007 | Peterson et al. |
| 7,274,972 B2 | 9/2007 | Amundson et al. |
| 7,302,642 B2 | 11/2007 | Simon et al. |
| 7,331,852 B2 | 2/2008 | Ezell et al. |
| 7,574,871 B2 | 8/2009 | Bloemer et al. |
| 7,584,897 B2 | 9/2009 | Schultz et al. |
| 7,788,936 B2 | 9/2010 | Peterson et al. |
| 7,798,418 B1 | 9/2010 | Rudd et al. |
| 7,979,163 B2 | 7/2011 | Terlson et al. |
| 8,147,302 B2 | 4/2012 | Sharp et al. |
| 8,219,249 B2 | 7/2012 | Harrod et al. |
| 8,515,584 B2 | 8/2013 | Miller et al. |
| 8,543,244 B2 | 9/2013 | Keeling et al. |
| 8,596,078 B2 | 12/2013 | Williams et al. |
| 8,694,166 B2 | 4/2014 | Quirk et al. |
| 8,702,482 B2 | 4/2014 | Helt et al. |
| 8,788,104 B2 | 7/2014 | Hadzidedic et al. |
| 8,903,565 B2 | 12/2014 | Mahaney, Jr. et al. |
| 8,918,218 B2 | 12/2014 | McMillan et al. |
| 2003/0127914 A1 | 7/2003 | Homan et al. |
| 2004/0034484 A1 | 2/2004 | Solomita, Jr. et al. |
| 2004/0253918 A1 | 12/2004 | Ezell et al. |
| 2006/0004492 A1 | 1/2006 | Terlson et al. |
| 2006/0158051 A1 | 7/2006 | Bartlett et al. |
| 2006/0172182 A1 | 8/2006 | Barton et al. |
| 2007/0056299 A1 | 3/2007 | Shankweiler et al. |
| 2009/0099814 A1 | 4/2009 | Scott et al. |
| 2009/0140058 A1 | 6/2009 | Koster et al. |
| 2009/0140063 A1 | 6/2009 | Koster et al. |
| 2009/0140064 A1 | 6/2009 | Schultz et al. |
| 2011/0223850 A1 | 9/2011 | Narayanamurthy et al. |
| 2013/0219931 A1 | 8/2013 | Childs et al. |
| 2013/0308674 A1* | 11/2013 | Kramer ............... G01K 15/005 374/1 |
| 2014/0041401 A1 | 2/2014 | Douglas et al. |
| 2014/0058567 A1 | 2/2014 | Matsuoka et al. |

FOREIGN PATENT DOCUMENTS

| | | |
|---|---|---|
| JP | 06241533 A | 8/1994 |
| JP | 2001248880 A | 9/2001 |

OTHER PUBLICATIONS

"Santa Fe Ultra Efficient Dehumidifier", 4 pgs., Nov. 18, 2003.

"Therma-Stor Ultra-Aire APD 100V", (http://www.thermastor.com/DesktopDefault.aspx?tabid=245), 2 pgs., Nov. 18, 2003.

"Ultra-Aire APD Air Purifying Dehumidifier Model UA-100V", 2 pgs.

"Ultra-Aire APD Air Purifying Dehumidifier Model UA-150H", 2 pgs., May 2000.

"Ultra-Aire APD Control Panel Installation", (TS-242A-1299), 1 pg.

ANSI/ASHRAE, "ANSI/ASHRAE Standard 62.2-2010 Ventilation and Acceptable Indoor Air Quality in Low-Rise Residential Buildings", ISSN 1041-2336, 2010, pp. 1-14.

Tashtoush et al., "Dynamic model of an HVAC system for control analysis," Energy 30.10 (2005):1729-1745, Apr. 27, 2004, 17 pgs.

Li et al., "Energy Efficient HVAC System with Distributed Sensing and Control," ntu.edu.sg, Future Cities Laboratory, Singapore ETH Center, ETH Zurich, pp. 1-10.

* cited by examiner

SYSTEM AND METHOD FOR ADJUSTING FRACTIONAL ON-TIME AND CYCLE TIME TO COMPENSATE FOR WEATHER EXTREMES AND MEET VENTILATION REQUIREMENTS

CROSS-REFERENCE TO RELATED APPLICATIONS

This application claims priority to U.S. Provisional Patent Application No. 62/030,953, filed Jul. 30, 2014, the contents of which are hereby incorporated by reference in their entirety.

BACKGROUND

The present disclosure relates to the field of indoor air ventilation and, more specifically, relates to the regulation of indoor ventilation (e.g., in heating, ventilation, and air conditioning (HVAC) systems).

Ventilation may be regulated for a variety of reasons and in a multiude of ways. For example, the American Society of Heating, Refrigerating, and Air Conditioning Engineers (ASHRAE) has created a set of standards and guidelines relating to ventilation and air quality. These standards and guidelines are often referred to by other promulgators of building codes in order to establish municipal guidelines for safe construction.

ASHRAE Standard 62.2 establishes standards for whole-building ventilation. ASHRAE Standard 62.2-2010 defines a method for determining a continuous ventilation rate that is needed for acceptable indoor air quality. The 2012 and 2015 versions of the International Mechanical Code and International Residential Code (IRC) reference this standard as the basis for the ventilation rates required to meet building code. Numerous other standards bodies cite the ASHRAE standard to define acceptable ventilation rates.

ASHRAE Standard 62.2-2010 allows for intermittent ventilation to meet the continuous ventilation rate requirement. Intermittent ventilation requires that the ventilation flow rate be higher than the required continuous ventilation rate. The ASHRAE standard defines the ventilation flow rate to be $Qf=Qr/(\epsilon * F)$, where:

$Qf$=ventilation flow rate
$Qr$=continuous ventilation rate
$\epsilon$=ventilation effectiveness
$F$ =the on time of the vent source divided by the cycle time Ventilation effectiveness ($\epsilon$) is a function of the fractional on-time ($F$) and the cycle time. Cycle times, as defined in the ASHRAE standard, are bins of 0-4 hours, 8 hours, 12 hours and 24 hours. During the 0-4 hour cycle time bin the effectiveness is equal to one; there is no effectiveness "penalty." For example, during the 0-4 hour cycle time bin, if the required continuous ventilation rate ($Qr$) is 75 cubic feet per minute (CFM), an intermittent ventilation flow rate of 150 CFM is allowed as long as the fractional on time is 0.5. This could be accomplished by turning on the 150 CFM flow source for 30 minutes every hour, one hour every two hours, two hours every four hours or any other combination as long as the cycle time is four hours or less and the fraction of the cycle time that the flow source is on is equal to 0.5.

For each successively higher cycle time bin, the effectiveness is reduced as the fractional on-time gets smaller and the ventilation flow rate ($Qf$) must be increased. For example, if the cycle time bin is selected as 8 hours, and the fractional on-time remains at 0.5, the ASHRAE standard defines the effectiveness to be 0.94 and thus the required ventilation flow rate would be 160 CFM. Alternatively the same 150 CFM flow source could be used but would need to operate at a fractional on time larger than 0.5; the calculation to determine the increased fractional on-time isn't outlined in the body of the ASHRAE standard. Whether resulting in increased airflow or increased fractional on-time, increasing the cycle time has the effect of increasing the total ventilation flow over a 24-hour period and subsequently increasing the energy cost to condition the outside air.

Existing products offer the ability to calculate the fractional on-time based on a known, constant ventilation flow rate and ventilation requirement. Existing products also have the ability to restrict ventilation when the outdoor temperature is too high or too low. If ventilation is restricted in these existing products, however, that time is either lost or added to subsequent a cycle time using an unchanged fractional on-time. Simply disregarding the ventilation on-time that was missed due to temperature or humidity extremes will not meet the ventilation requirement. Adding the missed time without the changing the fractional on-time disregards the effectiveness variable defined in the ASHRAE standard and again will result in the required ventilation not being met.

SUMMARY

Accordingly, a ventilation method and system is disclosed for providing adequately ventilated air to an indoor environment (e.g., using an HVAC system) over time while avoiding certain periods of times where conditions or ventilation control variables tend to be less optimal or less preferable for ventilation (e.g., periods of times of less preferable actual, forecast or predicted temperatures, periods of times of less preferable actual, forecast or predicted humidities, less preferable actual, forecast or predicted air quality, periods of times where occupancy of the indoor environment is less favorable or preferable for ventilation, periods of times when it is less desirable to operate HVAC (e.g, due to energy costs or constraints), during a period of time when the status of the HVAC system is less favorable for initiating ventilation (e.g., at a time when there is no call for heating or cooling), etc.), than other periods of times where conditions or control variables tend to be more optimal or preferable for ventilation. Further, such a method and system may also be used to satisfy certain ventilation standards including ASHRAE ventilation standards.

Accordingly, a method for providing ventilation is provided, the method comprising: determining a comprehensive target cycle time, whereby the comprehensive target cycle time is determined as a function of a first incremental target cycle time; obtaining a first measure of a control variable useable to determine preferable ventilation timing; comparing the first measure to a predetermined value or range of values for the control variable; and determining whether to initiate or continue ventilation based on (a) the comparison of the first measure to the predetermined value or range of values for the control variable, (b) the value of an incremental target cycle time counter relative to the first incremental target cycle time, and (c) the value of a comprehensive target cycle time counter relative to the comprehensive target cycle time.

BRIEF DESCRIPTION OF THE DRAWINGS

Various examples of embodiments of the systems, devices, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to the Figures, a system and method of automatically calculating and controlling an amount of ventilation run time (e.g., the amount of ventilation run time required to meet the ventilation requirements of ASHRAE 62.2-2010 and/or others given a substantially fixed ventilation flow rate). In various embodiments, a system, implementing the disclosed method, uses a fractional on-time input that assumes an initial one hour cycle time, and automatically adjusts the fractional on-time if the cycle time increases.

Using the disclosed method, the system allows for the delay or restriction of ventilation during less than optimal or extreme air quality or occupancy conditions (e.g., during extreme or less preferable outdoor temperature and/or humidity conditions) in anticipation and/or in favor or ventilation during more optimal or preferable air quality or occupancy conditions. In various embodiments, using in-system sensors, adjustable high and/or low settings are compared to a measured outdoor temperature or humidity condition and if the outdoor condition(s) exceed(s) or fall(s) below the selected settings, little or no ventilation air is brought in. Reduced ventilation on-time may require that the system's cycle time be adjusted to a higher value to meet or make up the ventilation requirement at a later time.

Using this method, in various embodiments, the ventilation system automatically adjusts to the lowest possible cycle time (e.g., as defined in the standard) to keep the effectiveness value as high as possible. Starting at a cycle time of one hour, if ventilation on-time is restricted due to relative temperature and/or humidity extremes, in various embodiments, the system determines the next highest cycle time and automatically calculates and adjusts the fractional on-time to meet ventilation requirements such as the ventilation requirements of ASHRAE 62.2-2010 or other standards, or to otherwise meet personal comfort and/or preferences. If ventilation on-time is not restricted, the fractional on-time may be met within the hour and, at the end of the hour, the cycle time can be reset to one hour. Using the disclosed method, in various embodiments, the system limits the cycle time to a maximum of 24-hours as defined in the ASHRAE 62.2-2010 standard. At the end of the 24-hour cycle time, the required ventilation on-time can be met without regard to temperature or humidity limits.

This method helps ensure that a required amount of ventilation for acceptable indoor air quality, (e.g., as defined in ASHRAE 62.2-2010 or others) is met. Energy use required to condition the outdoor ventilation air may be reduced or minimized by avoiding or reducing ventilating during periods of the day when the outdoor air temperature and/or relative humidity are at their relative extreme values.

In various embodiments, this method is implemented in connection with an HVAC control system. In various embodiments, this control system includes a ventilation fan having a duct to or in communication with the outside, and/or a central air conditioning system blower, having one or more ducts within the space or outside. It should be appreciated, however, that the method may be initiated outside of the operation of or a call to an HVAC control system.

In various embodiments, this method helps assure a required amount of ventilation as defined in ASHRAE 62.2-2010 or others is met by automatically changing the cycle time and fractional on-time as needed or desired to help account for any time missed due to relative temperature and/or humidity extremes. In various embodiments, the simplicity of the disclosed method allows for a user to input a static fractional on-time based on effectiveness equal to one as a basis for the dynamic determination of cycle time and fractional on-time.

Figure 1:
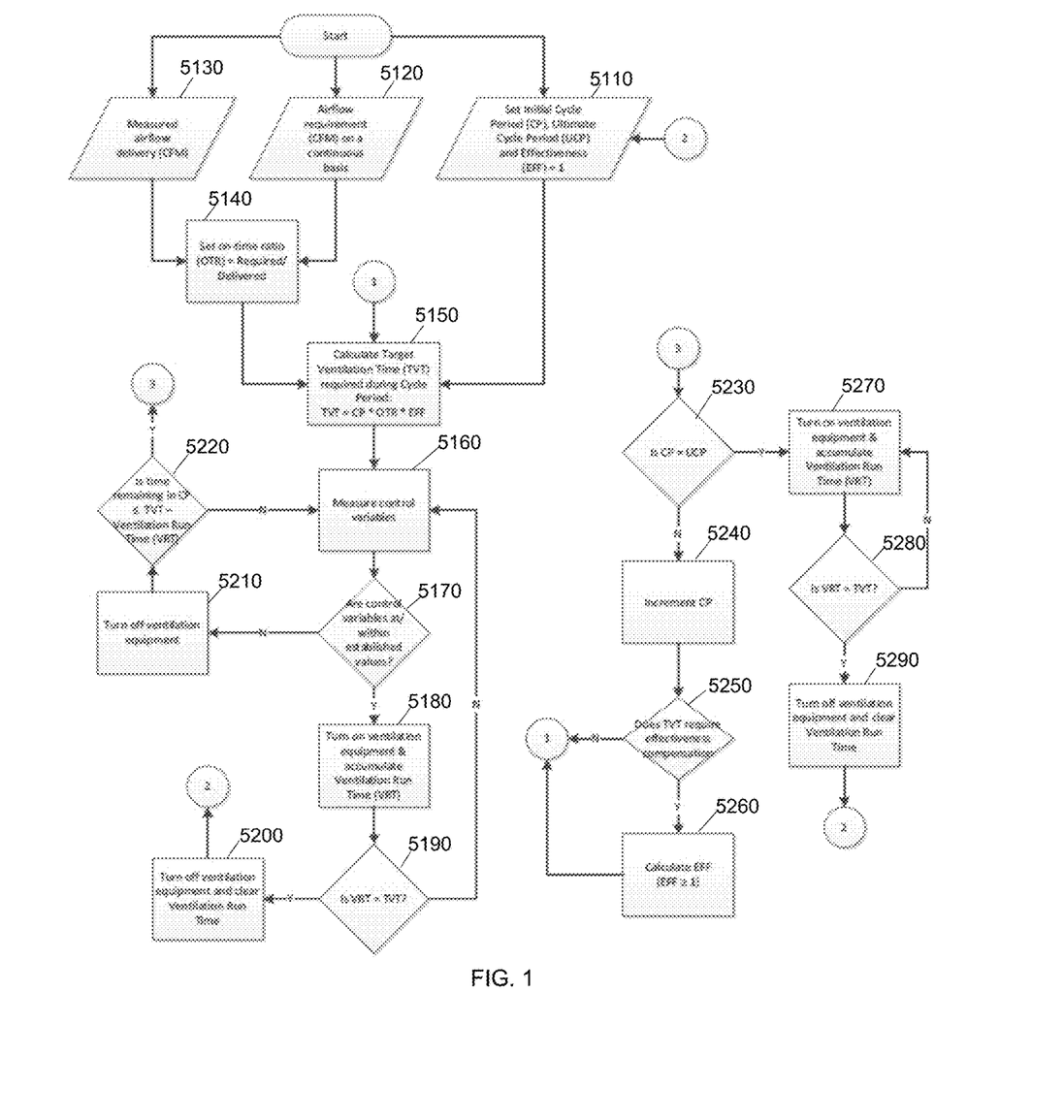
FIG. 1 illustrates a flow diagram of a program or method for adjusting fractional on-time and cycle time to compensate for weather extremes and meet ventilation requirements, according to various examples of embodiments.

Referring to FIG. 1, a process flow diagram a report or a method for adjusting fractional on time and cycle time to compensate for whether variables and meeting ventilation requirements is illustrated. In Step S110, in various embodiments, an initial or first incremental cycle period, and ultimate or comprehensive cycle period, and an effectiveness adjustment or compensation are set. In Step S120, in various embodiments, an airflow requirement on a continuous basis is determined. In Step S130, in various embodiments, the airflow delivery is also measured or determined. From Steps S120 and S130, in various embodiments, the process moves to Step S140, where the on time ratio is set or determined.

From Steps S110 and S140, in various embodiments, the process moves to Step S150. In Step S150, in various embodiments, a target ventilation cycle time or incremental target cycle time is determined based on known delivered ventilation airflow and known continuous ventilation or requirement that is to be achieved during an established cycle. From Step S150, in various embodiments, the process moves to Step S160, where one or more control variables such as ventilation air temperature and/or humidity, air quality including particulate levels, time of day, dates, occupancy or expected occupancy, energy costs or constraints, the status of HVAC systems or equipment, the status of calls to HVAC systems or equipment of other control variables useable to help determine preferable or less preferable ventilation times or time periods are measured. While FIG. 1 indicates the control variables are measured before turning on the ventilation equipment and accumulating any ventilation run time, it should be noted that the ventilation equipment may be turned on, and run time accumulated, for some predetermined time before measuring one or more of the control variables. From Step S160, in various embodiments, the process moves to Step S170, where a determination is made as to whether the control variables are at or within established or predetermined values or ranges of values. If the control variables are equal to or within the established values or ranges of values, in various embodiments the process moves to Step S180, where the ventilation equipment is turned on or allowed to continue to run and ventilation run time is accumulated. In various embodiments, the process then moves to Step S190 from Step S180, where the ventilation run time is compared to the target ventilation time or incremental target cycle time. If the ventilation run time is equal or greater than the target ventilation time, in various embodiments, the process moves to Step S200, where the ventilation equipment is discontinued or powered down and the ventilation run time is cleared or reset, and the process returns to Step S110.

If, in Step S190, it is determined that the ventilation run time is less than the target ventilation time or incremental target cycle time, in various embodiments, the process may return to Step S160, and the control variables measured again. In other various embodiments, if the ventilation run time is less than the target ventilation time, the process may simply return to Step S180, where the ventilation equipment is allowed to continue to run and ventilation run time continues to accumulate.

If in Step S170 it is determined that the control variables are outside established or predetermined values or ranges of values, in various embodiments the process moves to Step S210, where the ventilation equipment is turned off or powered down. Following Step S210, in various embodiments, the process moves to Step S220, where a determination is made as to whether the time remaining in the initial cycle period or first incremental cycle period is less than or equal to the difference between the target ventilation time and the ventilation run time. If it is determined in Step S220 that the time remaining in the initial cycle period or first incremental cycle period is greater than the target ventilation time required during the cycle period less the ventilation run time, in various embodiments, the process returns to Step S160, where one or more of the control variables are again measured. If in Step S220 it is determined that the time remaining in the initial or a first incremental cycle period is less than or equal to the difference between the target ventilation time required during the initial or first incremental cycle period and the actual accumulated ventilation run time, in various embodiments, the process moves to Step S230. In Step S230, in various embodiments, a determination is made as to whether the initial or first incremental cycle period is equal (e.g., in length of time) to the ultimate or comprehensive cycle period. If it is determined in Step S230 that the initial or first incremental cycle period is not equal to the ultimate or comprehensive cycle period, in various embodiments, the first incremental cycle period moves or is changed to a second or subsequent and longer incremental cycle period. In Step S240, once the second incremental cycle period is set, in various embodiments, the process moves to Step S250. In Step S250, in various embodiments, a determination is made as to whether the second or subsequent incremental cycle period requires an effectiveness adjustment or compensation. If the target ventilation time of the next or subsequent cycle period does not require compensation for effectiveness, in various embodiments, the process returns to Step S150, where a new target ventilation time required during the next or subsequent cycle period is determined. If the next or subsequent cycle period requires compensation for effectiveness, in various embodiments, the process moves to Step S260, where the effectiveness compensation is determined, and then the process returns to Step S150, where the target ventilation time required during the cycle period is calculated using the calculated effectiveness.

Returning to Step S230, if it is determined in Step S230 that the initial cycle period is equal to the ultimate or comprehensive cycle period set in Step S110, in various embodiments, the process moves to Step S270, where the ventilation equipment is turned on or powered on and ventilation run time is accumulated. From Step S270, in various embodiments, the process moves to Step S280, where a determination is made as to whether the ventilation run time is equal to the target ventilation time. If the ventilation run time is less than the target ventilation time, in various embodiments, the process returns to Step S270, where the ventilation equipment is allowed to continue to run, and the ventilation run time continues to accumulate. If in Step S280, it is determined that the ventilation run time is equal or greater than the target ventilation time, run the process moves to Step S290, where the ventilation equipment is turned off or powered down, and the ventilation run time is cleared or reset. From Step S290, run the process returns to Step S110.

Figure 2:
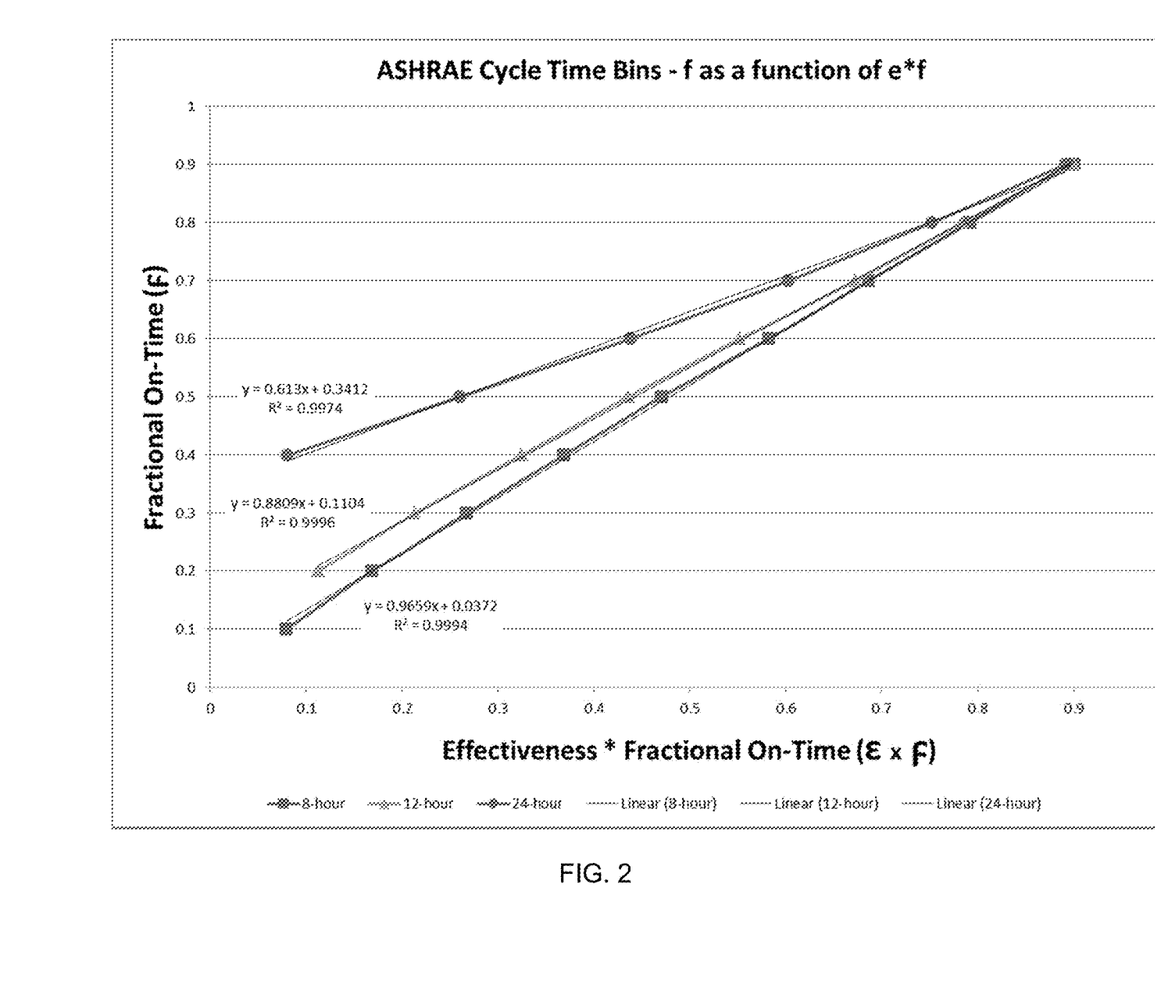
FIG. 2 is a graph depicting regression analysis models of fractional on time as a function of effectiveness and fractional on time for eight, twelve and twenty-four hour cycle times, according to various examples of embodiments.
Figure 3:
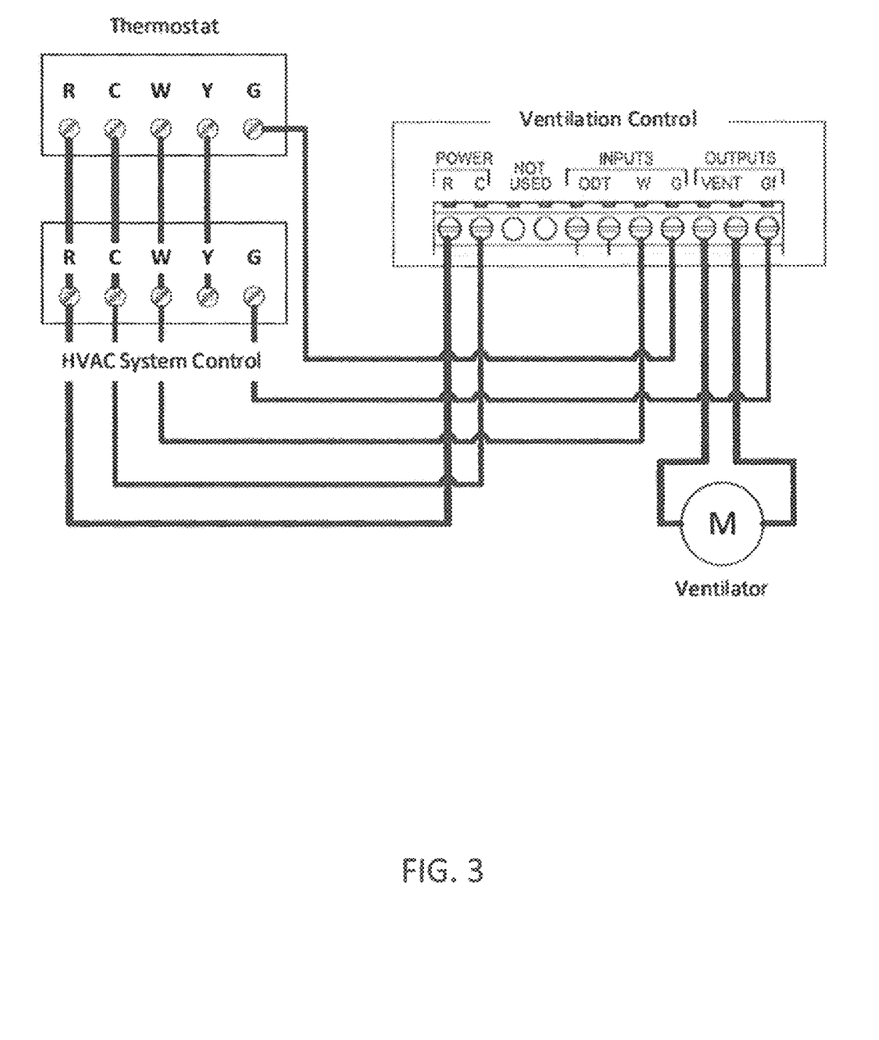
FIG. 3 illustrates wiring between components of a system for adjusting fractional on-time and cycle time to compensate for weather extremes and meet ventilation requirements, according to various examples of embodiments.

A more detailed description of various embodiments based on an initial cycle period of one hour, subsequent cycle periods of four hours, eight hours and twelve hours, and a comprehensive or ultimate cycle period of twenty-four follows. While an initial cycle period of one hour, subsequent cycle periods of four, eight and twelve hours, and a twenty-four hour comprehensive target cycle time are more specifically disclosed herein, it should be appreciated that various cycle periods and target cycle times may be utilized within the scope of this invention. In various embodiments, a comprehensive (e.g., 24-hour) target cycle time is determined as a function of a first incremental target cycle time. For example, the comprehensive target cycle time may be determined based on a regression fit analysis shown in FIG. 2. More specifically, the comprehensive target cycle time may be determined based on the regression fit analysis for the 24-hour cycle time shown in FIG. 2. In various embodiments, the comprehensive target cycle time is determined by multiplying a first variable by the first incremental target cycle time to create a first product, adding to the first product a second variable, and making any adjustments to make sure the units are consistent (in minutes). For example, in various embodiments, the comprehensive (e.g, 24-hour) target cycle time is calculated based on the following equation: the comprehensive target cycle time (minutes)=(0.613*(a first incremental target cycle time (minutes)/60)+0.341)*60*24.

In various embodiments, a first incremental cycle period (e.g., a one hour period) is set. In various embodiments, an incremental target cycle time counter and a comprehensive target cycle time counter are set or reset to a predetermined number or value (e.g., zero). In various embodiments, a ventilation fan is powered up or operated after receiving a call for heat or cooling (e.g., a W or G input) at the start or following a reset of a comprehensive target cycle time period, and the incremental target cycle time counter and the comprehensive target cycle time counter are started or incremented. In various embodiments, a quality of ventilation air (such as temperature or humidity) brought in by the ventilation fan is measured once or after the incremental target cycle time counter and/or the comprehensive target cycle time counter reaches a first predetermined value (e.g., 5 minutes). The ventilation air measurement may be made or taken in a variety of places or locations such as outside a dwelling serviced by the HVAC control system, in duct work for the HVAC control system, in the dwelling itself, etc.

For example, with the W or G input, following a reset of the Cycle Period, in various embodiments, the Vent and Gh outputs are turned on for five minutes regardless of whether the W or G input continues. In various embodiments, the temperature or humidity of the ventilation air is measured five minutes after the Vent output is turned on. In various embodiments, the measured quality (e.g., temperature and/ or humidity) of the ventilation air is compared to a predetermined range of qualities (e.g., range of temperatures and/or humidities).

In various embodiments, a determination whether to continue operating the ventilation fan is made based on (a) the temperature and/or humidity measurement of ventilation air relative to the predetermined range of temperatures and/or humidities, (b) the value of the incremental target cycle time counter relative to the first incremental target cycle time, and (c) the value of the comprehensive target cycle time counter relative to the comprehensive target cycle time. In various embodiments, the ventilation fan continues to operate provided the temperature and/or humidity measurements of ventilation air are determined to be within the predetermined range of temperatures and/or humidities, until a change in value of the incremental cycle time counter equals the first incremental target cycle time or a change in value of the comprehensive target cycle time counter reaches equals the comprehensive target cycle time. In various embodiments, operation of the ventilation fan is temporarily discontinued if (a) the temperature and/or humidity measurement of ventilation air is determined to be outside the predetermined ranges of temperatures and/or humidities, (b) a change in value of the incremental cycle time counter equals or exceeds the first incremental target cycle time, or (c) a change in value of the comprehensive target cycle time counter equals or exceeds the comprehensive target cycle time.

In various embodiments, if initiated by a W or G input, ventilation stops when the input is no longer present. In various embodiments, ventilation restarts if a W or G input starts again, or if the time remaining in a comprehensive target cycle time period (e.g., 24-hour period) is equal to the difference between the comprehensive target cycle time and the value of the comprehensive target cycle time counter. During an initial or first target cycle time period (e.g., one hour period), or when switching to a new incremental cycle time period (e.g., a second, third or fourth incremental cycle time period), the air temperature and/or humidity may be checked only the first or initial time during the respective period that ventilation is initiated. In various embodiments, if the quality (e.g., temperature or humidity) of the ventilation or inlet air is within the predetermined or set range(s), the incremental cycle time is met during the respective incremental cycle period. In various embodiments, if the incremental cycle time is met during the respective incremental cycle period, the incremental cycle time counter is reset (e.g., to zero) and the first incremental cycle period is also reset (e.g. to zero).

If neither a W nor G input has occurred, and the time remaining in the Cycle Period is equal to the difference between the Target Cycle Time and Cycle Time, in various embodiments, the Vent and Gh outputs are turned on.

In various embodiments, if the temperature and/or humidity measurement is higher than the high or lower than the low set limits, the ventilation blower and/or output(s) are turned off. In various embodiments, a second incremental cycle period (e.g., a four-hour period) is set and a second incremental target cycle time is set such that a ratio of the first incremental target cycle time to the first incremental cycle period is identical to (or greater than) a ratio of the second incremental target cycle time to the second incremental cycle period. For example, in various embodiments, the second incremental cycle period is set to two hundred forty minutes and the second incremental target cycle time is increased to four times the first incremental target cycle time.

In various embodiments, the ventilation fan is started or operated again after receiving a call for heat or cooling or ventilation after the first incremental cycle period. In various embodiments, the incremental target cycle time counter and comprehensive target cycle time counter are restarted. In various embodiments, the air temperature and/or humidity is again sampled once or after the incremental target cycle time counter and/or the comprehensive target cycle time counter reaches a second predetermined number. For example, in various embodiments, the air temperature and/or humidity is again sampled five minutes after there is a W or G input following the end of the first incremental time period, and the air temperature and/or humidity measurements are compared to a predetermined range of temperature and/or humidity values. In various embodiments, a determination whether to continue operation of ventilation fan is then made based on (a) the second temperature and/or humidity measurement of ventilation air relative to the predetermined temperature and/or humidity ranges, (b) the value of the incremental target cycle time counter relative to the second incremental target cycle time, and (c) the value of the comprehensive target cycle time counter relative to the comprehensive target cycle time.

In various embodiments, the ventilation fan continues to operate provided the second temperature and/or humidity measurement(s) of ventilation air are determined to be within the predetermined ranges of temperatures and/or humidities, until a change in value of the second incremental cycle time counter equals the second target cycle time or a change in value of the comprehensive target cycle time counter equals the comprehensive target cycle time. In various embodiments, operation of the ventilation fan is discontinued if (a) the temperature and/or humidity measurement of ventilation air is determined to be outside the predetermined temperature and/or humidity ranges, (b) a change in value of the incremental cycle time counter equals the second incremental target cycle time, or (c) a change in value of the comprehensive target cycle time counter equals the comprehensive target cycle time.

The ventilation fan may also be started or resume operation if the time remaining in the comprehensive cycle period is equal to the difference between the Target Cycle Time and Cycle Time. For example, in various embodiments, operation of the ventilation fan is continued or re-started when the difference between 1440 minutes and the comprehensive target cycle time substantially equals (or exceeds) the difference between the comprehensive target cycle time and a change in value of the comprehensive target cycle time counter.

In various embodiments when the air temperature is determined to be within range, the Vent and Gh outputs turn on whenever the W or G input is on, or when the time remaining in the second incremental target cycle time is substantially equal to the difference between the second incremental cycle period and the value of the incremental target cycle time counter. At the end of the second incremental cycle period, in various embodiments, if the second incremental target cycle time has been met, the process resets (e.g., the first incremental cycle period (e.g., a one hour period) is set or reset, and the incremental target cycle time counter and comprehensive target cycle time counter are set or reset to a predetermined number or value (e.g., zero).

At the end of the second incremental cycle period, in various embodiments, if the incremental target cycle time counter change in value has not met the second incremental target cycle time, a third incremental cycle period is set to 480 minutes, and a third incremental target cycle time is determined as a function of the first incremental target cycle time. For example, the third incremental target cycle time may be determined based on a regression fit analysis shown in FIG. 2. More specifically, the third incremental target cycle time may be determined based on the regression fit analysis for the 8-hour cycle time shown in FIG. 2. In various embodiments, the third incremental target cycle time is determined by multiplying a third variable by the first incremental target cycle time to create a second product, adding to the second product a fourth variable, and making any adjustments to make sure the units are consistent (in minutes). For example, in various embodiments, the third incremental target cycle time is calculated based on the following equation: the third incremental target cycle time (minutes)=(0.966*(the first incremental target cycle time (minutes)/60)+0.037)*60*8.

In various embodiments, the ventilation fan or blower is restarted, powered on or operated after receiving a call for heat, cooling, or ventilation after the second cycle period, and the incremental target cycle time counter and the comprehensive target cycle time counter are started or incremented again. Once or after the incremental target cycle time counter and/or the comprehensive target cycle time counter reaches a third predetermined number or change in value (e.g., 5 minutes after the incremental target cycle time counter and/or the comprehensive target cycle time counter are restarted following the second incremental time period), the temperature and/or humidity of the ventilation air are measured and compared to predetermined temperature and/or humidity ranges or values.

For example, with a W or G input following the second incremental time period, in various embodiments, the Vent and Gh outputs are turned on for five minutes regardless of whether the W or G input continues. In various embodiments, the temperature or humidity of the ventilation air is measured five minutes after the Vent output is turned on. Again, the ventilation air measurement may be made or taken in a variety of places or locations such as outside a dwelling serviced by the HVAC control system, in duct work for the HVAC control system, in the dwelling itself, etc. In various embodiments, the measured quality (e.g., temperature and/or humidity) of the ventilation air is compared to a predetermined range of qualities (e.g., range of temperatures and/or humidities).

In various embodiments, a determination whether to continue operating the ventilation fan is made based on the temperature of ventilation air measured at the time the incremental target cycle time counter and/or the comprehensive target cycle time counter reaches a third predetermined number or change in value, the value of the incremental target cycle time counter and the value of the comprehensive target cycle time counter. In various embodiments, the ventilation fan continues to operate, provided the temperature and/or humidity of ventilation air measured at about the time the incremental target cycle time counter and/or the comprehensive target cycle time counter reaches a third predetermined number or change in value is within the predetermined range of temperatures and/or humidities, until the incremental cycle time counter reaches the third target cycle time or the comprehensive target cycle time counter reaches the comprehensive target cycle time. Once or after the incremental cycle time counter reaches the third target cycle time or the comprehensive target cycle time counter reaches the comprehensive target cycle time, the ventilation fan or blower is powered down or is temporarily stopped or discontinued, and the incremental target cycle time counter may be reset (e.g., to zero).

In various embodiments, operation of ventilation fan is temporarily discontinued if the measured temperature and/or humidity of the ventilation air, taken at or about the time the incremental target cycle time counter and/or the comprehensive target cycle time counter reaches the third predetermined number or change in value, is outside a predetermined range of temperatures, the incremental cycle counter equals or exceeds the third incremental target cycle time or the comprehensive cycle counter equals or exceeds the comprehensive cycle counter target value. In various embodiments, operation of ventilation fan restarts or resumes when or before the difference between the comprehensive target cycle time and the comprehensive target cycle time counter is equal to the time remaining in a comprehensive target cycle time period.

If the Vent output(s) are on without the measured ventilation air temperature or humidity having been in range, in various embodiments, the output(s) are turned off, and fifty-five minutes are allowed to elapse before the air temperature and/or humidity is sampled again.

At the end of the third incremental cycle period, in various embodiments, if the incremental target cycle time counter change in value has not met the third incremental target cycle time, a fourth incremental cycle period is set to 720 minutes, and a fourth incremental target cycle time is determined as a function of the first incremental target cycle time. For example, the fourth incremental target cycle time may be determined based on a regression fit analysis shown in FIG. 2. More specifically, the fourth incremental target cycle time may be determined based on the regression fit analysis for the 12-hour cycle time shown in FIG. 2. In various embodiments, the fourth incremental target cycle time is determined by multiplying a fifth variable by the first incremental target cycle time to create a third product, adding to the third product a sixth variable, and making any adjustments to make sure the units are consistent (in minutes). For example, in various embodiments, the fourth incremental target cycle time is determined or calculated based on the following equation: the fourth incremental target cycle time (minutes)=(0.881*(the first incremental target cycle time (minutes)/60)+0.110)*60*12.

In various embodiments, the ventilation fan or blower is restarted, powered on or operated after receiving a call for heat, cooling, or ventilation after the third cycle period, and the incremental target cycle time counter and the comprehensive target cycle time counter are started or incremented again. Once or after the incremental target cycle time counter and/or the comprehensive target cycle time counter reaches a fourth predetermined number or change in value (e.g., 5 minutes after the incremental target cycle time counter and/or the comprehensive target cycle time counter are restarted following the third incremental time period), the temperature and/or humidity of the ventilation air are measured and compared to predetermined temperature and/or humidity ranges or values.

For example, with a W or G input following the third incremental time period, in various embodiments, the Vent and Gh outputs are turned on for five minutes regardless of whether the W or G input continues. In various embodiments, the temperature or humidity of the ventilation air is measured five minutes after the Vent output is turned on. Again, the ventilation air measurement may be made or taken in a variety of places or locations such as outside a dwelling serviced by the HVAC control system, in duct work for the HVAC control system, in the dwelling itself, etc. In various embodiments, the measured quality (e.g., temperature and/or humidity) of the ventilation air is compared to a predetermined range of qualities (e.g., range of temperatures and/or humidities).

In various embodiments, a determination whether to continue operating the ventilation fan is made based on the temperature of ventilation air measured at the time the incremental target cycle time counter and/or the comprehensive target cycle time counter reaches a fourth predetermined number or change in value, the value of the incremental target cycle time counter and the value of the comprehensive target cycle time counter. In various embodiments, the ventilation fan continues to operate, provided the temperature and/or humidity of ventilation air measured at about the time the incremental target cycle time counter and/or the comprehensive target cycle time counter reaches a fourth predetermined number or change in value is within the predetermined range of temperatures and/or humidities, until the incremental cycle time counter reaches the fourth target cycle time or the comprehensive target cycle time counter reaches the comprehensive target cycle time. Once or after the incremental cycle time counter reaches the fourth target cycle time or the comprehensive target cycle time counter reaches the comprehensive target cycle time, the ventilation fan or blower is powered down or is temporarily stopped or discontinued, and the incremental target cycle time counter may be reset (e.g., to zero).

In various embodiments, operation of ventilation fan is temporarily discontinued if the measured temperature and/or humidity of the ventilation air, taken at or about the time the incremental target cycle time counter and/or the comprehensive target cycle time counter reaches the fourth predetermined number or change in value, is outside a predetermined range of temperatures, the incremental cycle counter equals or exceeds the fourth incremental target cycle time or the comprehensive cycle counter equals or exceeds the comprehensive cycle counter target value. In various embodiments, operation of ventilation fan restarts or resumes when or before the difference between the comprehensive target cycle time and the comprehensive target cycle time counter is equal to the time remaining in a comprehensive target cycle time period.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

Moreover, some portions of the detailed descriptions herein are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities. Unless specifically stated otherwise as apparent from the discussions herein, it is appreciated that throughout the present invention, discussions utilizing terms such as "receiving," "sending," "generating," "reading," "invoking," "selecting," and the like, refer to the action and processes of a computer system, or similar electronic computing device, including an embedded system, that manipulates and transforms data represented as physical (electronic) quantities within the computer system.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

I claim:

1. A method for providing ventilation, the method comprising:

determining a comprehensive target cycle time, whereby the comprehensive target cycle time is determined as a function of a first incremental target cycle time using the following equation: the comprehensive target cycle time (minutes)=(0.613*(the first incremental target cycle time (minutes)/60)+0.341)*60*24;

obtaining a first measure of a control variable useable to determine preferable ventilation timing;

comparing the first measure to a predetermined value or range of values for the control variable;

determining whether to initiate or continue ventilation based on (a) the comparison of the first measure to the predetermined value or range of values for the control variable, (b) the value of an incremental target cycle time counter relative to the first incremental target cycle time, and (c) the value of a comprehensive target cycle time counter relative to the comprehensive target cycle time; and operating a ventilation fan to ventilate an indoor environment, provided the first measure is equal to the predetermined value and/or within the predetermined range of values for the control variable, until a change in value of the incremental cycle time counter equals the first incremental target cycle time or a change in value of the comprehensive target cycle time counter reaches equals the comprehensive target cycle time.

2. The method of claim 1, further comprising:

temporarily discontinuing operation of the ventilation fan if (a) the first measure is not equal to the predetermined value and/or is outside the predetermined range of values for the control variable, (b) the change in value of the incremental cycle time counter equals the first incremental target cycle time, or (c) the change in value of the comprehensive target cycle time counter equals the comprehensive target cycle time.

3. The method of claim 2, further comprising setting a first incremental cycle period.

4. The method of claim 3, further comprising:

setting a second incremental cycle period;

setting a second incremental target cycle time such that a ratio of the first incremental target cycle time to the first incremental cycle period is identical to a ratio of the second incremental target cycle time to the second incremental cycle period;

obtaining a second measure of the control variable;

comparing the second measure to the predetermined value or range of values for the control variable; and determining whether to initiate or continue ventilation based on (a) the comparison of the second measure to the predetermined value or range of values for the control variable, (b) the value of the incremental target cycle time counter relative to the second incremental target cycle time, and (c) the value of the comprehensive target cycle time counter relative to the comprehensive target cycle time.

5. The method of claim 4, further comprising:

operating a ventilation fan to ventilate an indoor environment, provided the second measure is equal to the predetermined value and/or within the predetermined range of values for the control variable, until a change in value of the second incremental cycle time counter equals the second target cycle time or a change in value of the comprehensive target cycle time counter equals the comprehensive target cycle time.

6. The method of claim 4, further comprising:

temporarily discontinuing operation of the ventilation fan if (a) the second measure is not equal to the predetermined value and/or outside the range of values for the control variable, (b) a change in value of the incremental cycle time counter equals the second incremental target cycle time, or (c) a change in value of the comprehensive target cycle time counter equals the comprehensive target cycle time.

7. The method of claim 6, further comprising:

setting a third incremental cycle period;

setting a third incremental target cycle time, whereby the third incremental target cycle time is determined as a function of a first incremental target cycle time;

obtaining a third measure of the control variable;

comparing the third measure to the predetermined value or range of values for the control variable; and determining whether to initiate or continue ventilation based on the comparison of the third measure to the predetermined value or range of values for the control variable, the value of the incremental target cycle time counter and the value of the comprehensive target cycle time counter.

8. The method of claim 7, wherein the third incremental target cycle time is determined using the following equation:

$$\text{the third incremental target cycle time (minutes)} = (0.966 * (\text{the first incremental target cycle time (minutes/hour)})/60) + 0.037) * 60 * 8.$$

9. The method of claim 7, further comprising:

operating a ventilation fan to ventilate an indoor environment, provided the third measure is equal to the predetermined value and/or within the predetermined range of values for the control variable, until the incremental cycle time counter reaches the third target cycle time or the comprehensive target cycle time counter reaches the comprehensive target cycle time.

10. The method of claim 7, further comprising:

temporarily discontinuing operation of the ventilation fan if the third measure is not equal to the predetermined value and/or outside the predetermined range of values for the control variable, the incremental cycle counter equals the third incremental target cycle time, or the comprehensive cycle counter equals the comprehensive cycle counter target value.

11. The method of claim 10, further comprising:

setting a fourth incremental cycle period;

setting a fourth incremental target cycle time, whereby the fourth incremental target cycle time is determined as a function of a first incremental target cycle time;

obtaining a fourth measure of the control variable;

comparing the fourth measure to the predetermined value or range of values for the control variable; and determining whether to initiate or continue ventilation based on the comparison of the fourth measure to the predetermined value or range of values for the control variable, the value of the incremental target cycle time counter, and the value of the comprehensive target cycle time counter.

12. The method of claim 11, wherein the fourth incremental target cycle time is determined using the following equation:

$$\text{the fourth incremental target cycle time (minutes)} = (0.881 * (\text{the first incremental target cycle time (minutes)})/60) + 0.110) * 60 * 12.$$

13. The method of claim 1, further comprising:

operating a ventilation fan to ventilate an indoor environment, provided the fourth measure is equal to the predetermined value and/or within the predetermined range of values for the control variable, until the incremental cycle time counter reaches the fourth target cycle time or the comprehensive target cycle time counter reaches the comprehensive target cycle time.

14. The method of claim 13, further comprising:
  temporarily discontinuing operation of the ventilation fan if the fourth measure is not equal to the predetermined value and/or outside the predetermined range of values for the control variable, the incremental cycle counter equals the fourth incremental target cycle time, or the comprehensive cycle counter equals the comprehensive cycle counter target value.

* * * * *